US 6,817,023 B2

(12) United States Patent
Minase

(10) Patent No.: US 6,817,023 B2
(45) Date of Patent: Nov. 9, 2004

(54) DISK DEVICE

(75) Inventor: Minoru Minase, Iruma (JP)

(73) Assignee: Teac Corporation, Tokyo (JP)

( * ) Notice: Subject to any disclaimer, the term of this patent is extended or adjusted under 35 U.S.C. 154(b) by 133 days.

(21) Appl. No.: 09/967,549

(22) Filed: Sep. 28, 2001

(65) Prior Publication Data

US 2002/0039340 A1 Apr. 4, 2002

(30) Foreign Application Priority Data

Oct. 2, 2000 (JP) .......................... 2000-302602

(51) Int. Cl.$^7$ ............................ G11B 33/02; G11B 33/14
(52) U.S. Cl. ...................................... 720/648; 720/655
(58) Field of Search .............................. 369/77.1, 77.2, 369/75.1, 75.2; 720/600, 601, 653, 648, 649, 655

(56) References Cited

U.S. PATENT DOCUMENTS

| | | | | |
|---|---|---|---|---|
| 4,329,722 A | * | 5/1982 | West ........................ 360/97.03 |
| 4,633,349 A | * | 12/1986 | Beck et al. ............... 360/97.02 |
| 4,772,974 A | * | 9/1988 | Moon et al. .............. 360/78.04 |
| 5,086,422 A | * | 2/1992 | Hagiya et al. ............. 369/75.1 |
| 5,124,856 A | * | 6/1992 | Brown et al. ............. 360/97.03 |
| 5,237,560 A | * | 8/1993 | Tani et al. ................... 369/291 |
| RE34,497 E | * | 1/1994 | Blanks ..................... 360/97.02 |
| 5,615,070 A | * | 3/1997 | Bordes ........................ 360/133 |
| 6,144,522 A | * | 11/2000 | Myokan et al. .......... 360/97.02 |
| 6,426,932 B2 | * | 7/2002 | Omori et al. ............... 369/75.1 |

FOREIGN PATENT DOCUMENTS

| JP | 60038781 A | * | 2/1985 | ........... G11B/33/14 |
|---|---|---|---|---|
| JP | 62076088 A | * | 4/1987 | ........... G11B/33/14 |
| JP | 01182991 A | * | 7/1989 | ........... G11B/33/14 |
| JP | 02061884 A | * | 3/1990 | ........... G11B/33/14 |
| JP | 02081395 A | * | 3/1990 | ........... G11B/33/14 |
| JP | 03008194 A | * | 1/1991 | ........... G11B/33/14 |
| JP | 03207076 A | * | 9/1991 | ........... G11B/33/14 |
| JP | 05198155 A | * | 8/1993 | ........... G11B/33/14 |
| JP | 06036547 A | * | 2/1994 | ........... G11B/33/14 |
| JP | 2861793 | | 3/1994 | |
| JP | 07098978 A | * | 4/1995 | ........... G11B/33/14 |

* cited by examiner

*Primary Examiner*—William Klimowicz
(74) *Attorney, Agent, or Firm*—Anderson Kill & Olick P.C.; Eugene Lieberstein; Michael N. Meller

(57) ABSTRACT

A disk device includes a housing in which a disk is provided, a disk support member for supporting the disk in the housing so that the disk can be rotated, and a driving part for rotating the disk support member, wherein the housing includes an air intake part for introducing air to an adjacent place to the disk support member.

12 Claims, 7 Drawing Sheets

DISK DEVICE

BACKGROUND OF THE INVENTION

1. Field of the Invention

The present invention relates to disk devices, and more particularly, to a disk device for recording or playing back information from a recording medium installed in the disk device.

2. Description of the Related Art

It is desirable to miniaturize a disk device into which a disk-shaped recording medium (hereinafter "disk") such as a CD-ROM is installed for the purpose of equipping a notebook type personal computer with the disk device. To accomplish this, the cover in the housing of the disk device, the tray for supporting the disk, and the housing frame must be thin, compact and relatively strong.

Furthermore, spacing between respective members must be reduced so that not only is the disk device thin, but that it will be difficult for fine particles to enter the housing. In fact, the disk device design should make it difficult for fine particles to adhere on an objective lens such as the optical pick up or an optical part such as a mirror.

FIG. 1 is a longitudinal sectional view showing a structure of a conventional disk device 1.

Referring to FIG. 1, the conventional disk device 1 includes a tray 5 located between an upper cover 2 and an under cover 3 which form a housing. A disk 4 is installed in the tray 5. A turn table 6 for clamping the disk 4 is arranged in the housing so that the turn table 6 can be rotated. The upper cover 2 is located adjacent to an upper end of the turn table 6 in order to reduce the thickness of the disk device 1. An opening 7 is arranged at the upper cover 2 opposite to an upper end of the turn table 6 in order to maintain a small gap between the upper cover 2 and the upper end of the turn table 6. A seal member 8 is sealed on a canter of an upper face of the upper cover 2 in order to block the opening 7.

In the conventional disk device, the disk motor 9 is driven thereby rotating the disk 4 while the disk 4 is clamped to the turn table 6. Air in a center part of the disk moves due to rotation of the disk on the outer circumference of the disk as a result of a centrifugal force which acts on a surface of the disk 4 as shown by the arrows in FIG. 1. The flow of air results in the occurrence of a negative pressure. Hence, there is a possibility that the upper cover 2 opposite to the center part of the disk rotation will be bent forward toward the turn table 6, or a center part of the tray 5 supporting the turn table 6 will be bent forward toward the upper cover 2.

Heretofore, there has been a problem with the conventional disk device in that once clamped the upper cover 2 or the tray 5 is bent, the disk 4 clamped by the turn table 6 touches the upper cover 2 due to the occurrence of the above-mentioned negative pressure, so that it is no longer possible to rotate the disk 4 at a constant speed.

On the other hand, if the strengths of the upper cover 2 and the tray 5 are sufficiently enhanced to prevent the upper cover 2 or tray 5 from bending due to the occurrence of the above-mentioned negative pressure, the disk device can not be adequately thinned down to miniaturize the disk device.

SUMMARY OF THE INVENTION

Accordingly, it is a general object of the present invention is to provide a novel and useful disk device in which the problems described hereinabove are eliminated.

Another and more specific object of the present invention is to prevent a disk once it is rotated at a constant speed from touching the housing of the disk device due to the occurrence of negative pressure.

The above objects of the present invention achieved by the disk device of the present invention-comprising a disk support member for supporting the disk in a housing in which the disk can be rotated, and a driving part for rotating the disk support member, wherein the housing further comprises an air intake part for introducing air into a locaton between the disk support member and disk.

According to the present invention, the air intake part introduces air into the disk device such that even if a negative pressure occurs due to rotaton of the disk, air will enter from the outside of the device into the housing only from the air intake part at a location near the center, directly above or below the turntable. Accordingly, the housing near the center of a disk cannot be deformed, and it is not necessary to strengthen the housing and tray even if the disk device is very thin.

Another object of the present invention is to prevent fine particles from entering into the housing and to prevent an optical pick up from being contaminated due to adhesion of the fine particles on the optical pick up.

The above object of the present invention is achieved by the use of an air intake part, which includes a filter for removing air particles in the air.

According to the above invention, the filter in the air intake part removes fine particles. Hence, even if a negative pressure exists due to the disk rotating, it is possible to prevent fine particles from entering into the housing from the outside through the air intake part. Accordingly, it is possible to prevent an optical pick up from being contaminated due to adhesion of the fine particles on the optical pick up.

Other objects, features, and advantages of the present invention will be more apparent from the following detailed description when read in conjunction with the accompanying drawings.

DETAIL DESCRIPTION OF THE PREFERED EMBODIMENTS

A description will now be given, with reference to the drawings, of embodiments of the present invention.

Figure 1:
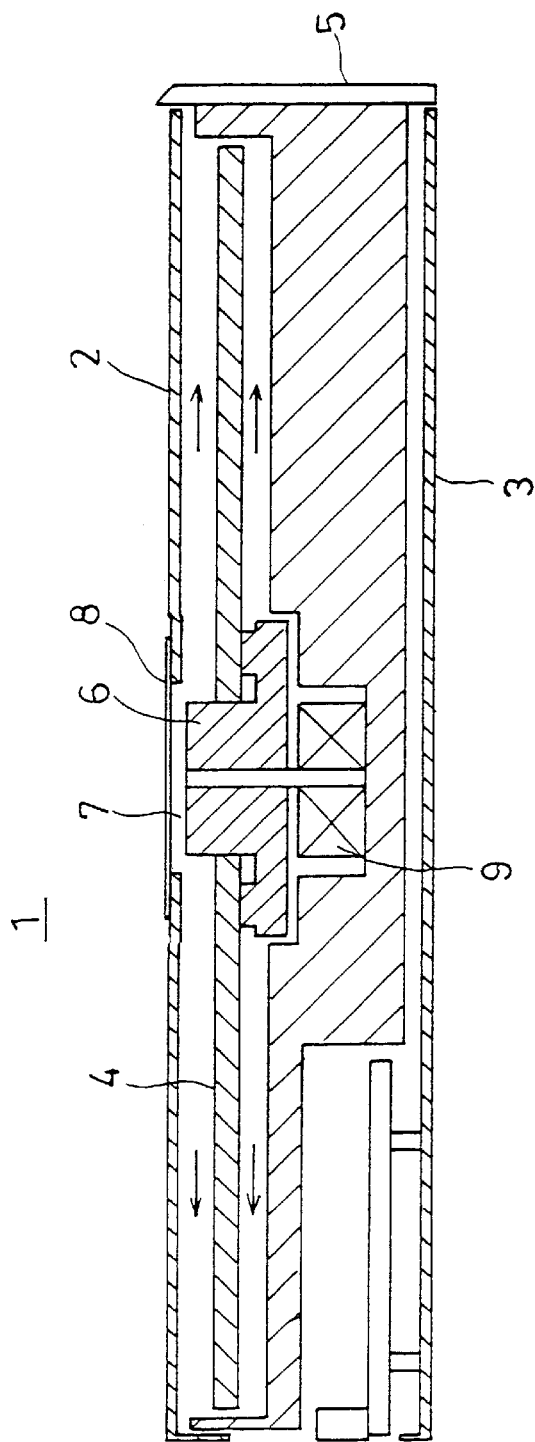
FIG. 1 is a longitudinal sectional view showing a structure of a conventional disk device.
Figure 2:
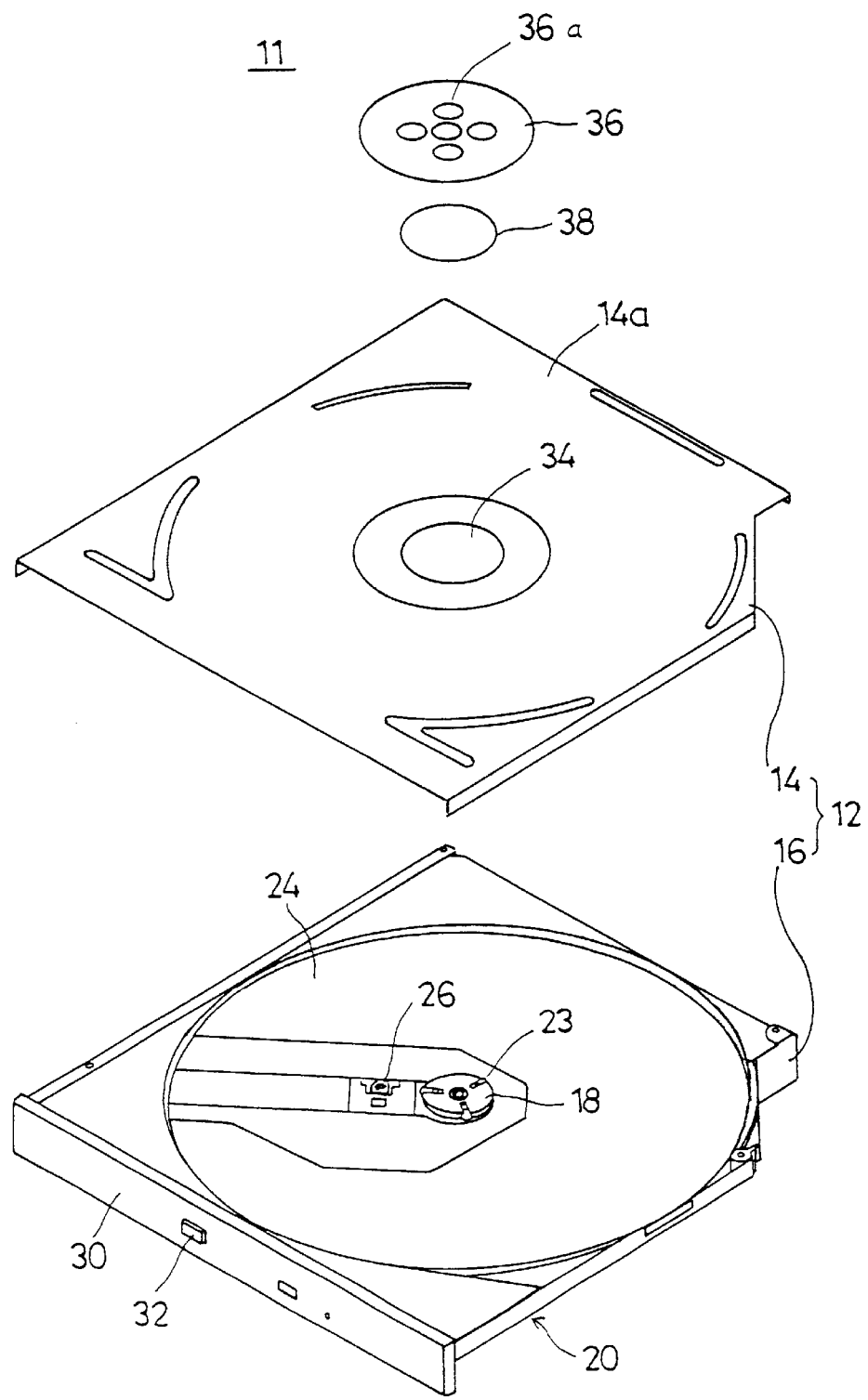
FIG. 2 is an exploded and perspective view showing a first embodiment of a disk device according to the present invention.
Figure 3:
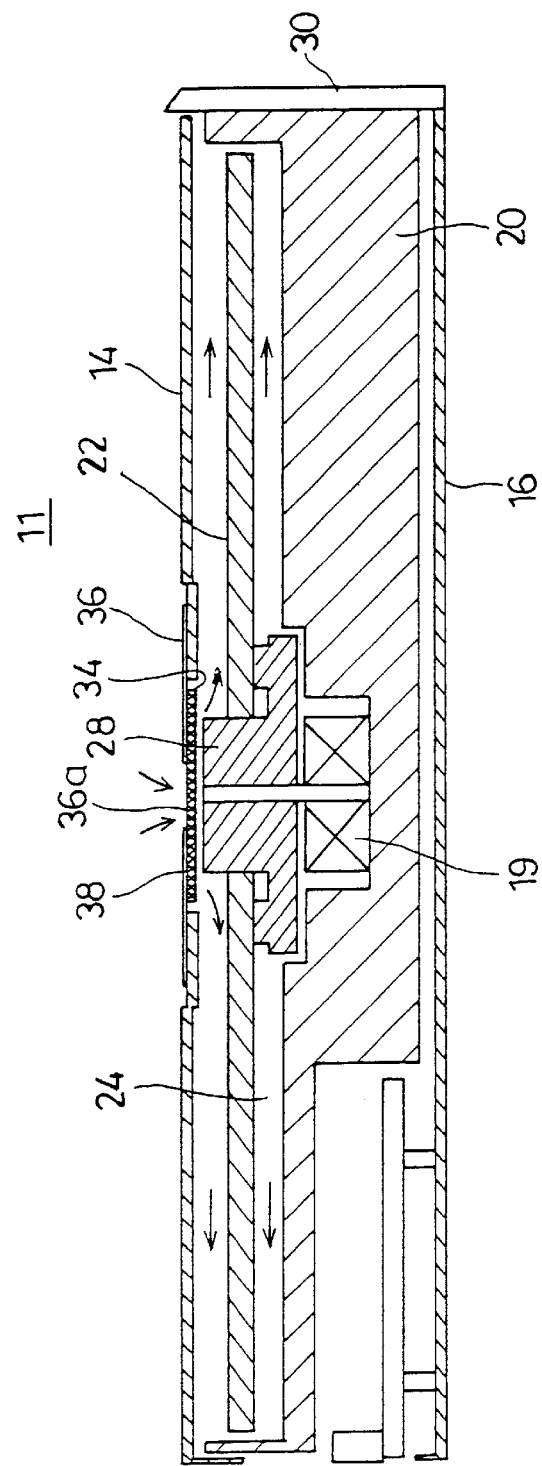
FIG. 3 is a longitudinal cross sectional view showing the first embodiment according to the present invention.

FIG. 2 is an exploded and perspective view showing a first embodiment of a disk device according to the present invention. FIG. 3 is a longitudinal sectional view showing the first embodiment according to the present invention.

Referring to FIGS. 2 and 3, a disk device 11 includes a tray 20 supporting a turn table 18 in a place between an upper cover 14 and an under cover 16 which form a housing 12. The turn table 18 can be rotated in the above-mentioned place. In the center of the turn table, there is a clamp mechanism 23 clamping a disk 22 so as to engage with an inner circumference of the disk 22. A disk storage part 24 having a diameter bigger than that of the disk 22, is provided around the turn table 18.

A optical pick up 26 is a means for reading out information recorded in the disk 22 clamped by the clamp mechanism 23 of the turn table 18. The optical pick up 26 is arranged below the disk storage part 24 as being capable to move toward to a disk radius side. A front side bezel 30 connected with a front side of the tray 20 is equipped with an eject button 32 in the center of the front bezel 30.

Figure 7:
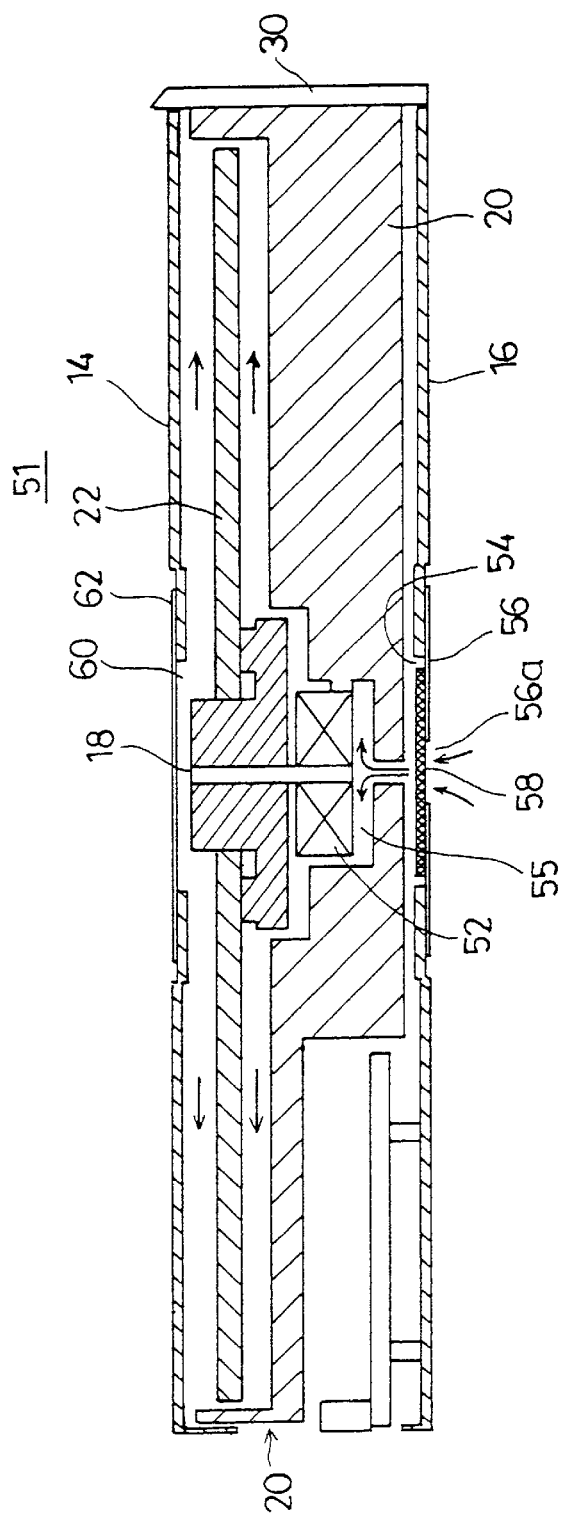
FIG. 7 is a longitudinal sectional view showing the second embodiment according to the present invention.

The upper cover 14 is manufactured by a bend processing of a sheet metal, so that it has a configuration shown in FIG. 7. The upper cover 14 also has an upper sheet part 14a for covering an upper face of the disk 22 clamped by the clamp mechanism 23 of the turn table 18. Air intake hole 34 is opened in a center part of an upper sheet part 14a of the upper cover 14. The air intake hole 34 is arranged at an upper place of the sheet part 14a opposite to a center part of the disk rotation of the turn table 18.

A fixed sheet 36 having a hole is sealed around the air intake hole 34. The fixed sheet 36 includes a lower surface, which is an adhesive face. Five vents 36a are formed in the center part of the fixed sheet 36. A filter 38 is sealed on the lower surface of the fixed sheet 36. The filter 38 is made of a fiber such as a cotton and removes fine particles in the air at the time of introducing air from the outside. A air intake part includes the air intake hole 34, the fixed sheet 36, and the filter 38.

The vents 36a in the fixed sheet 36 are openings for air passing and covered with the filter 38. Accordingly, once the lowering of pressure due to the rotation of the disk 22 occurs in the housing 12, the air passing through the vents 36a of the fixed sheet 36 opposite to the air intake hole 34 and the filter 38 is introduced into the housing 12. Hence, the fine particles included in the air are removed when passing through the vents 36a and the filter 38, so that the fine particles are prevented from entering into the housing 12. Accordingly, the fine particles do not adhere on an objective lens or a mirror in case of that the air is introduced into the housing 12. Therefore, the optical pick up 26 arranged in the housing 12 can be used in an environment in which the fine particles are apt to occur.

The turn table 18 and the disk 22 clamped by the clamp mechanism 23 of the turn table 18 drive as a disk motor 19 arranged below the turn table 18 drives for rotating the disk 22, air in the center part of the rotation moves to an outer circumference side of the disk 22 by a centrifugal force. At that time, if air pressure around the center part of the rotation falls under the pressure of the atmosphere, an outside air is introduced into the housing 12 through the vents 36a in the fixed sheet 36 as arrows in FIG. 2 show.

Hence, a negative pressure is prevented from occurring around the center part of the disk rotation, so that a center part of the upper cover 14 is prevented from being bent downward. The turn table 18 and the disk storage part 24 of the tray 20 are prevented from being bent upward. Accordingly, it is not necessary to heighten the strength of the upper cover 14 and the tray 20, so that the disk device can be thinned.

Besides, according to the disk device 11 of the present invention, the outside air is introduced into the housing 12 through the air intake hole 34, the fixed sheet 36 and the filter 38 when the air moves in the housing 12 on the basis of the rotation of the disk 22. Therefore, the outside air is prevented from being introduced into the housing 12 through a microscopic aperture of the housing 12. Hence, an air whirl through the microscopic aperture is prevented from occurring, so that it may be possible to reduce an occurrence of an action noise on the basis of the air whirl.

Furthermore, when the disk 22 is driven for rotating at high speed by the turn table 18, the outside air is introduced into the housing through the air intake hole 34, the vents 36a, and the filter 38. Therefore, an electric part connected on a board, particularly a motor driving IC or a power source IC with highly calorific values, can be cooled. Therefore, it is possible to provide a disk device with high reliance and long life.

Figure 4:
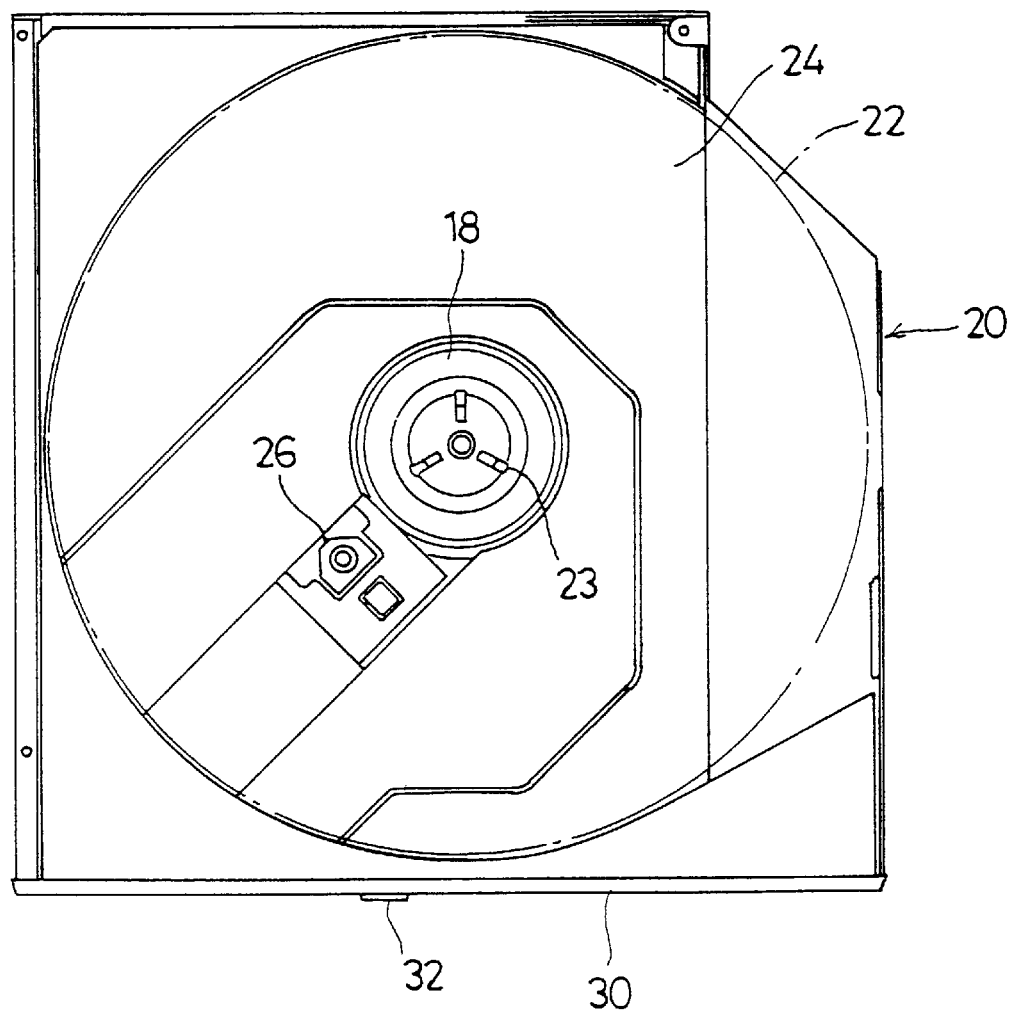
FIG. 4 is a plan view a state in which an upper cover 14 of the disk device is taken off.
Figure 5:
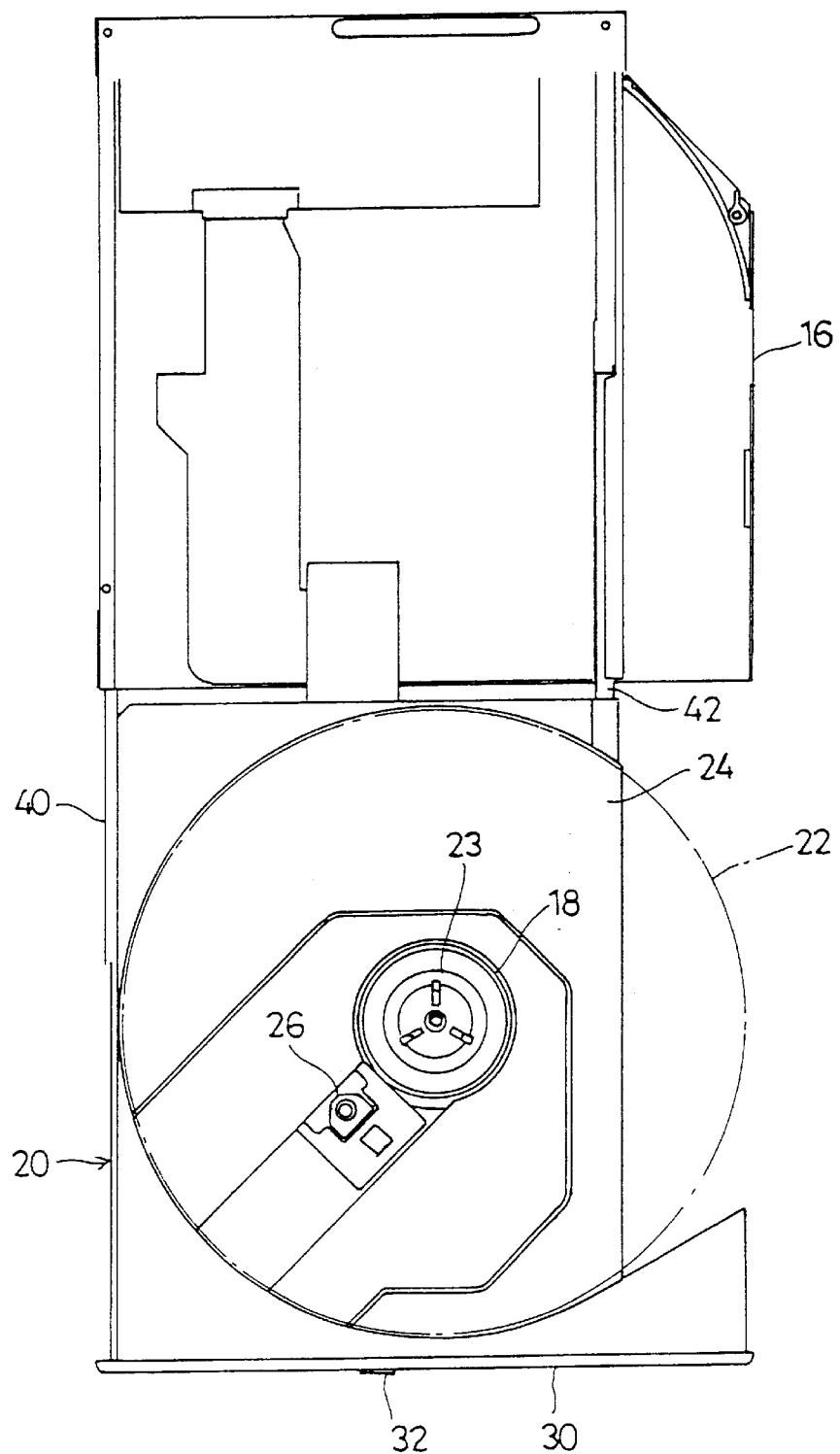
FIG. 5 is a plan view showing a state in which a tray 20 is pulled out at a position where a disk is exchanged.

FIG. 4 is a plan view showing a state in which the upper cover 14 of a disk device is taken off. FIG. 5 is a plan view showing a state in which a tray 20 is pulled out at a position where a disk is exchanged.

Referring to FIGS. 4 and 5, the tray 20 is supported at its both sides by guide rails 40 and 42, so that the tray 20 can slide in front and rear directions. If the eject button 32 on the front side bezel 30 is operated by pushing, a lock of the tray 20 is off. The tray 20 whose lock is off can be pulled out at the position where the disk can be exchanged by manual operation as shown in FIG. 5.

Figure 6:
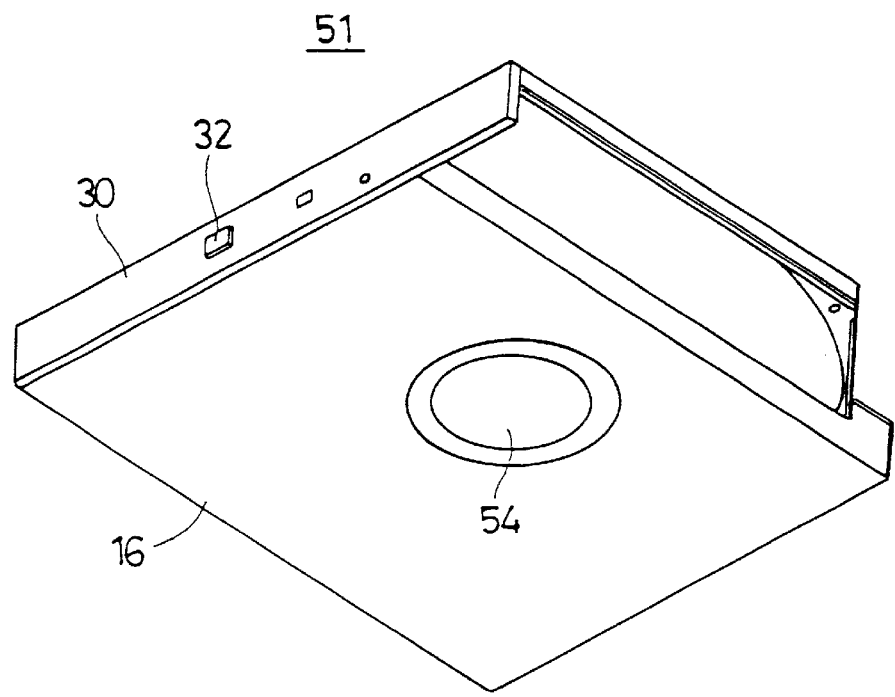
FIG. 6 is a perspective view showing a second embodiment according to the present invention.
Figure 6:
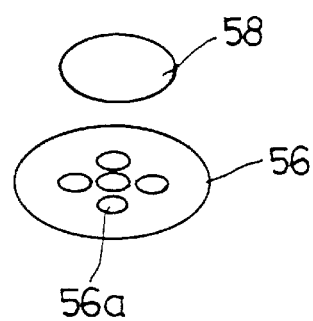

FIG. 6 is a perspective view showing a second embodiment according to the present invention. FIG. 7 is a longitudinal sectional view showing the second embodiment according to the present invention. In FIGS. 6 and 7, same mark will be put the same part as the one of the above first embodiment and its explanation will be omitted.

Referring to FIGS. 6 and 7, a disk device 51 has a lower cover 16, which has a base sheet part 16a for covering a lower face of a tray 20. Air intake hole 54 is opened on the center of the base sheet part 16a of the lower cover 16. The air intake hole 54 is arranged at a lower place, below a disk motor 52, and at an opposite place to a center part of the disk rotation of a turn table 18 by the motor 52.

A fixed sheet 56 having a hole is sealed around the air intake hole 54 as well as the fixed sheet 36 in the first embodiment is. The fixed sheet 56 includes a lower surface which is an adhesive face. Three vents 56a are formed in the center part of the fixed sheet 56. A filter 58 is sealed on a lower surface of the fixed sheet 56. The filter 58 is made of a fiber such as a cotton and removes fine particles in the air at the time of introducing air from the outside.

The vents 56a in the fixed sheet 56 are openings for air passing and covered with the filter 58. Accordingly, once the lowering of pressure due to the rotation of the disk 22 occurs in the housing 12, the air passing through the vents 56a of the fixed sheet 56 opposite to the air intake hole 54 and the filter 58 is introduced into the housing 12. Hence, the fine particles included in the air are removed when passing through the vents 56a and the filter 58, so that the fine particles are prevented from entering into the housing 12. Accordingly, the fine particles do not adhere on an objective lens or a mirror. Therefore, the optical pick up 26 arranged in the housing 12 can be used in an environment in which the fine particles are apt to occur.

The turn table 18 and the disk 22 clamped by the clamp mechanism 23 of the turn table 18 are driven by the disk motor 19, so that air of the center part of the rotation moves to an outer circumference side of the disk 22 by a centrifugal force. At that time, if air pressure around the center part of the rotation falls under the pressure of the atmosphere, an outside air is introduced into the housing 12 through the air intake hole 54 as arrows in FIG. 7 show, and is further introduced the air into the lower face side of the disk 22 through a gap 55 formed between the disk motor 52 and the tray 20.

Hence, a negative pressure is prevented from occurring around the center of the rotation, so that a center part of the upper cover 14 is prevented from being bent downward. The turn table 18 and the disk storage part 24 of the tray 20 are prevented from being bent upward. Accordingly, it is not necessary to heighten the strength of the upper cover 14 and the tray 20, so that the disk device can be thinned.

The upper cover 14 is adjacent and opposite to the upper side of the turn table 18 because of thinning the disk device. The upper cover 14 also includes an opening 60 in order to keep a gap between the upper table 14 and the upper side of the turn table 18. A seal member 62 is sealed in the center of the upper face of the upper cover 14 to block the opening 60.

The present invention is not limited to these embodiments, but various variations and modifications such as a disk device not including a tray may be made without departing from the scope of the present invention.

The patent application is based on Japanese priority patent application No. 2000-302602 filed on Oct. 2, 2000, the entire contents of which are hereby incorporated by reference.

What is claimed is:

1. A disk device comprising:

a housing which is not sealed in which a disk is provided;

a tray a disk support member including a turntable for supporting the disk in the housing so that the disk can be rotated, with the housing comprising a cover disposed in such close proximity to the disk that the space there between permits the presence of only said disk; and a driving part for rotating the disk support member;

wherein the housing further comprises an air intake part which is open to the atmosphere and is in direct communication with the disk for introducing outside air directly into the space between said cover and said disk when the disk rotates for minimizing the occurrence of negative pressure about the disk support member so that part of the housing near the center of disk rotation is prevented from being deformed.

2. The disk device as claimed in claim 1, wherein the air intake part is arranged adjacent said cover and at an opposite place to a center part of the disk rotation that is at an upper part of the disk support member.

3. The disk device as claimed in claim 1, wherein the air intake part is arranged in said housing opposite said cover along center part of the disk rotation that is at a below part of the driving part for directing outside air through the air intake part and between said tray and said disk and between said cover and said disk.

4. The disk device as claimed in claim 1, wherein the air intake part comprises a filter for removing air particles in the air.

5. The disk device as claimed in claim 4, wherein the air intake part further comprises a sheet having at least one vent, the sheet adheres to the filter.

6. The disk device as claimed in claim 1, wherein the outside air is prevented from being introduced into the housing through a microscopic aperture of the housing when the air moves in the housing on the basis of the rotation of the disk.

7. The disk device as claimed in claim 1, wherein the air intake part further comprises:

an opening part provided at the housing; and a sheet having at least one vent, the sheet is provided at the housing so as to cover the opening part.

8. The disk device as claimed in claim 1, wherein said tray is configured to support the disk and move from/to a position where the disk is exchanged.

9. The disk device as claimed in claim 8, wherein the disk support member is supported by the tray.

10. The disk device as claimed in claim 8, wherein the disk support member being supported by the tray is separated from the air intake part when the tray is positioned outside of the housing, and is arranged at a place below the air intake part when the tray is positioned in the housing.

11. The disk device as claimed in claim 8, wherein the driving part is supported by the tray.

12. The disk device as claimed in claim 8, wherein the driving part being supported by the tray, is separated from the air intake part when the tray is positioned outside of the housing, and is arranged at a place above the air intake part when the tray is positioned in the housing.

* * * * *